J. B. SMYTHE.
BRAKE MECHANISM FOR LIFTING JACKS.
APPLICATION FILED APR. 1, 1919.

1,315,874.

Patented Sept. 9, 1919.

Inventor:
Joseph B. Smythe,
by Walter E. Lombard,
Atty.

UNITED STATES PATENT OFFICE.

JOSEPH BURTON SMYTHE, OF COATICOOK, QUEBEC, CANADA.

BRAKE MECHANISM FOR LIFTING-JACKS.

1,315,874.   Specification of Letters Patent.   Patented Sept. 9, 1919.

Original application filed February 15, 1919, Serial No. 278,299. Divided and this application filed April 1, 1919. Serial No. 286,812.

*To all whom it may concern:*

Be it known that I, JOSEPH B. SMYTHE, a subject of the King of England, and a resident of Coaticook, Province of Quebec, Dominion of Canada, have invented certain new and useful Improvements in Brake Mechanism for Lifting-Jacks, of which the following is a specification.

This invention relates to brake mechanisms particularly adapted for use in connection with "self run-down jacks" such as shown and described in Letters Patent of the United States, No. 1,131,286 issued to Joseph O. St. Pierre, March 9, 1915.

The present invention is a division of another application of mine filed Feb. 15, 1919 and numbered 278,299.

The invention has for its object the provision of a manually actuated brake mechanism whereby the revoluble brake shaft may be locked normally but which may be unlocked when it is desired to lower the load, said brake mechanism also being adapted to control the speed of rotation of the revoluble shaft during the lowering operation.

The invention consists primarily in a brake disk secured to the revoluble shaft and brake members coacting therewith, under normal conditions, said brake members having projections extending into parallel slots in an oscillating member adapted to be manually actuated to remove simultaneously both brake members from contact with the brake disk when it is desired to lower the load.

The invention further consists in certain novel features of construction and arrangement of parts which will be readily understood by reference to the description of the drawings and to the claims to be hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings.

Similar characters indicate like parts throughout the several figures of the drawings.

Figure 1:
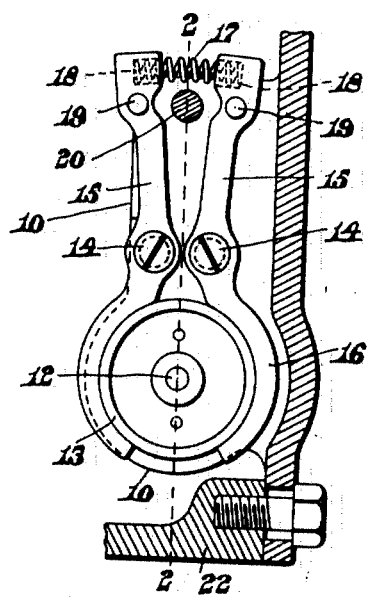
Figure 1 represents a vertical section of a portion of a lifting jack showing a brake mechanism embodying the principles of the present invention.
Figure 2:
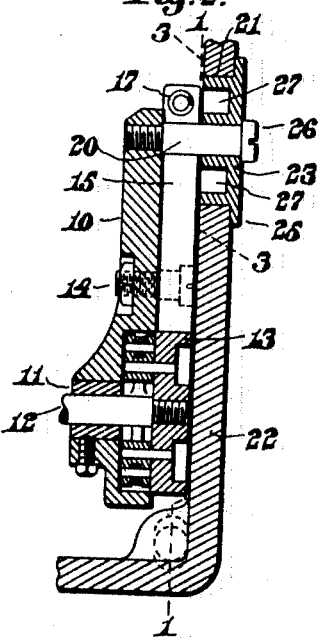
Fig. 2 represents a section of the same on line 2, 2, on Fig. 1.

In the drawings, 10 is a bracket having a bearing 11 for a revoluble shaft 12.

The shaft 12 is provided with a brake disk 13 which is secured thereto and revolves therewith. By means of studs 14, two brake members 15 are pivoted to the bracket 10, said brake members 15 having curved arms 16 which are adapted to be retained normally in contact with the brake disk 13 to prevent the rotation of the shaft 12.

The means employed to retain the arms 16 in contact with the periphery of said disk is a helical spring 17 the opposite ends of which are positioned in opposite sockets 18 in the upper ends of the members 15.

Each member 15 is provided with a lateral pin or projection 19 and intermediate said pins or projections 19 is a fixed stud 20 projecting outwardly from the bracket 10 through a cylindrical opening 21 in the casing 22, the cylindrical wall of said opening being concentric to the axis of said stud 20.

Disposed within said opening 21 is a flanged member 23 adapted to be oscillated about the axis of said stud by the radial operating arm 24.

The flange 25 on said oscillating member 23 prevents said member moving inwardly and the head 26 on the stud 20 prevents outward movement thereof.

Figure 3:
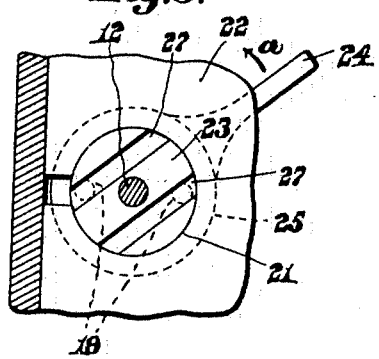
Fig. 3 represents a section of the same on line 3, 3, on Fig. 2.

The inner face of the oscillating member 23 is provided with two parallel slots 27 disposed on opposite sides of the stud 20 and normally positioned as indicated in Fig. 3 at an angle of about 45° to a horizontal line.

The outer ends of the pins 19 extend into said slots 27 and when the curved arms 16 are in contact with the brake disk 13, said pins 19 are in the positions indicated by dotted lines in Fig. 3.

If the operating arm 24 is moved inwardly by the operator in the direction of arrow "a" on Fig. 3, it is obvious that the pins 19 will be moved toward each other, compressing the spring 17 and removing the arms 16 from contact with the disk 13.

The spring 17 has sufficient tension to prevent the rotation of the disk 13 when the curved arms 16 are forced thereby into contact with said disk.

Should the shaft 12 rotate too rapidly when the arms 16 are released from the disk 13, the speed of the shaft may be retarded by moving the arm 24 so as to actuate the brake members 15 sufficiently to attain the required frictional contact between the arms 16 and disk 13 and effect the necessary retarding of speed of rotation.

Should all pressure be removed from the arm 24, the spring 17 will immediately force the arms 16 into such firm frictional contact with the disk 13 as to prevent further rotation of the shaft 12.

This makes a very simple and effective construction of brake mechanism for retarding the speed or completely stopping the rotation of a revoluble shaft.

It is believed that the operation and many advantages of the invention will be fully understood without further description.

Having thus described my invention, I claim—

1. The combination of a revoluble shaft; a cylindrical disk thereon; two movable brake members each provided with a lateral pin and having a cylindrical opening midway of its length through which a pivot member extends; a spring between said brake members adapted to retain them normally in frictional contact with the periphery of said disk; and an oscillating member provided with two parallel slots into which said pins project.

2. The combination of a revoluble shaft; a cylindrical disk thereon; two pivoted brake members each provided with a lateral pin and having a cylindrical opening midway of its length through which a pivot member extends; an expansion spring between the outer ends of said brake members adapted to retain them normally in frictional contact with the periphery of said disk; and an oscillating member provided with two parallel slots into which said pins project.

3. The combination of a revoluble shaft; a cylindrical disk thereon; a brake member; a pin projecting therefrom; a fixed support having a bearing for said shaft and a cylindrical opening; a stud centrally disposed in said opening; a flanged member on said stud within said opening and having a transverse slot in its inner face in which said pin is positioned; resilient means for normally retaining said brake member in contact with said disk; and means for oscillating said flanged member about the axis of said stud.

4. The combination of a revoluble shaft; a cylindrical disk thereon; two brake members therefor; resilient means for normally retaining said brake members in contact with said disk; a pin projecting from each brake member; a fixed support having a bearing for said shaft and a cylindrical opening; a stud centrally disposed in said opening; a flanged member on said stud within said opening and having two parallel slots disposed on opposite sides of said stud and in which said pins are positioned; and means for oscillating said flanged member and simultaneously removing said brake member from said disk.

Signed by me at Sherbrooke, Que., this 27th day of March, 1919.

JOSEPH BURTON SMYTHE.

Witnesses:
J. B. TYNE,
E. A. PATENAUDE.

Copies of this patent may be obtained for five cents each, by addressing the "Commissioner of Patents, Washington, D. C."